United States Patent [19]
Johnson et al.

[11] Patent Number: 5,380,426
[45] Date of Patent: Jan. 10, 1995

[54] ACTIVE BED FLUIDIZED CATALYST STRIPPING

[75] Inventors: David L. Johnson, Glen Mills, Pa.; David H. Parsons, Slidell, La.; Gerald J. Teitman, Vienna, Va.

[73] Assignee: Mobil Oil Corporation, Fairfax, Va.

[21] Appl. No.: 126,854

[22] Filed: Sep. 27, 1993

[51] Int. Cl.$^6$ .............. C10G 11/00; B01J 38/06; B01J 8/26; F27B 15/02
[52] U.S. Cl. ............ 208/113; 208/150; 208/151; 208/164; 422/144; 422/145; 502/41; 502/55
[58] Field of Search ........ 208/113, 150, 151, 164; 502/41, 55

[56] References Cited
U.S. PATENT DOCUMENTS

| | | | |
|---|---|---|---|
| 3,005,771 | 10/1961 | Baars et al. | 208/150 |
| 3,123,547 | 3/1964 | Palmer et al. | 208/164 |
| 4,043,899 | 8/1977 | Anderson et al. | 208/164 |
| 5,248,408 | 9/1993 | Owen | 208/113 |

Primary Examiner—Paul E. Konopka
Attorney, Agent, or Firm—Alexander J. McKillop; Malcolm D. Keen; Richard D. Stone

[57] ABSTRACT

A fluidized catalytic cracking process and apparatus with an active bed annular spent catalyst stripper is disclosed. An annular catalyst stripper disposed about a riser reactor is separated, by a baffle or fluid flow, into a secondary stripper nearer the catalyst regenerator and a primary stripper on the far side of the annular stripper from the regenerator. Catalyst flows through the primary stripper as a dense bed, to a transport means which lifts catalyst to the inlet of the secondary stripper. The "dead" region on side of annular strippers far from the regenerator is eliminated. Preferably catalyst is added to the primary stripper via cyclone diplegs, and a cyclone is used on the transport outlet.

18 Claims, 2 Drawing Sheets

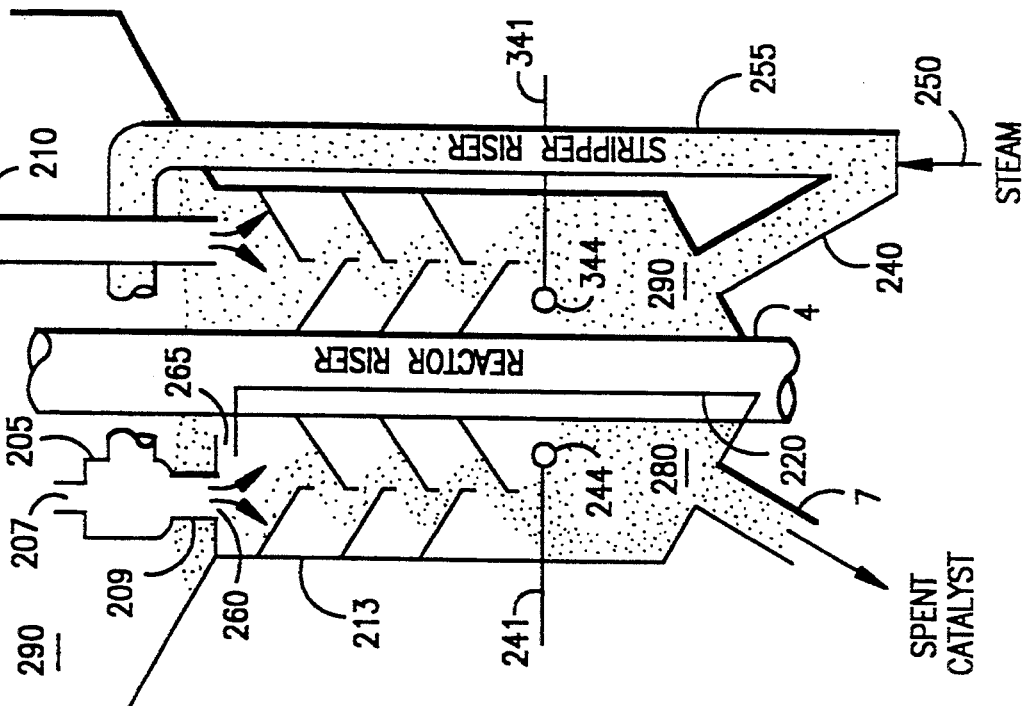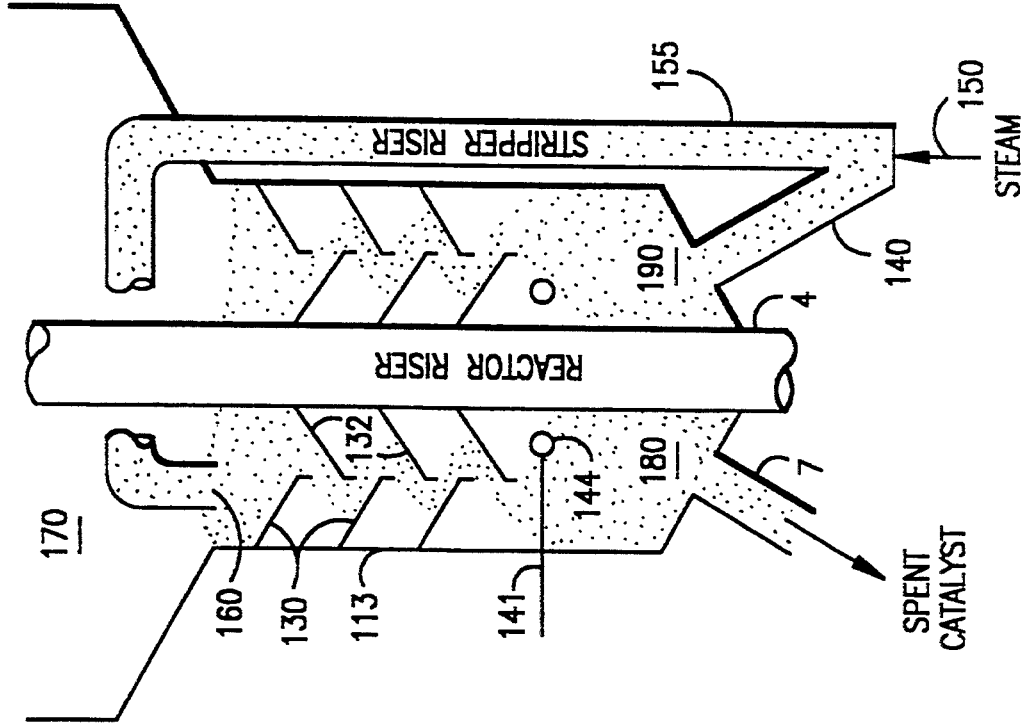

ACTIVE BED FLUIDIZED CATALYST STRIPPING

BACKGROUND OF THE INVENTION

1. Field of the Invention

The field of the invention is fluidized catalytic cracking in general and catalyst stripping in particular.

2. Description of Related Art

Catalytic cracking is the backbone of many refineries. It converts heavy feeds into lighter products by catalytically cracking large molecules into smaller molecules. Catalytic cracking operates at low pressures, without hydrogen addition, in contrast to hydrocracking, which operates at high hydrogen partial pressures. Catalytic cracking is inherently safe as it operates with very little oil actually in inventory during the cracking process.

There are two main variants of the catalytic cracking process: moving bed and the far more popular and efficient fluidized bed process.

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425 C.-600 C., usually 460 C.-560 C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500 C.-900 C., usually 600 C.-750 C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking is endothermic, it consumes heat. The heat for cracking is supplied at first by the hot regenerated catalyst from the regenerator. Ultimately, it is the feed which supplies the heat needed to crack the feed. Some of the feed deposits as coke on the catalyst, and the burning of this coke generates heat in the regenerator, which is recycled to the reactor in the form of hot catalyst.

Catalytic cracking has undergone progressive development since the 40s. The trend of development of the FCC process has been to all riser cracking and zeolite catalysts.

Riser cracking gives higher yields of valuable products than dense bed cracking. Most FCC units now use all riser cracking, with hydrocarbon residence times in the riser of less than 10 seconds, and even less than 5 seconds.

Zeolite based catalysts of high activity and selectivity are now used in most FCC units. These catalysts work best when coke on the catalyst after regeneration is less than 0.1 wt %, and preferably less than 0.05 wt %.

To regenerate FCC catalysts to low residual carbon levels, and to burn CO completely to CO2 within the regenerator (to conserve heat and minimize air pollution) many FCC operators add a CO combustion promoter to the catalyst or to the regenerator.

U.S. Pat. Nos. 4,072,600 and 4,093,535, which are incorporated by reference, teach use of combustion-promoting metals such as Pt, Pd, Ir, Rh, Os, Ru and Re in cracking catalysts in concentrations of 0.01 to 50 ppm, based on total catalyst inventory.

As the process and catalyst improved, refiners attempted to use the process to upgrade poorer quality feeds, in particular, feedstocks that were heavier, and had more metals and sulfur.

These heavier, dirtier feeds pushed the regenerator, and exacerbated four existing problem areas in the regenerator, sulfur, steam, temperature and NOx. These problems will each be reviewed in more detail below.

SULFUR

Much of the sulfur in the feed ends up as SOx in the regenerator flue gas. Higher sulfur feed, and complete CO combustion in the regenerator, increase the SOx content of the flue gas. Some attempts were made to minimize the amount of SOx discharged to the atmosphere by including catalyst additives to capture SOx in the regenerator. These additives pass with the regenerated catalyst back to the FCC reactor where the reducing atmosphere releases the sulfur compounds as H2S. Suitable agents are described in U.S. Pat. Nos. 4,071,436 and 3,834,031. Use of cerium oxide for this purpose is shown in U.S. Pat. No. 4,001,375.

Unfortunately, the conditions in most FCC regenerators are not the best for SOx adsorption. The high temperatures in modern FCC regenerators (up to 870 C. (1600 F.)) impair SOx adsorption. One way to minimize SOx in flue gas is to pass catalyst from the FCC reactor to a long residence time steam stripper, as in U.S. Pat. No. 4,481,103 Krambeck et al which is incorporated by reference. This process steam strips spent catalyst at 500-550 C. (932 to 1022 F.), to remove some undesirable sulfur- or hydrogen-containing components, but considerable capital expense is involved.

STEAM

Steam is known to cause catalyst deactivation. Steam is not intentionally added, but is invariably present, usually as adsorbed or entrained steam from steam stripping or catalyst or as water of combustion formed in the regenerator.

Poor stripping leads to a double dose of steam in the regenerator, first from the adsorbed or entrained steam and second from hydrocarbons left on the catalyst due to poor catalyst stripping. Catalyst passing from the FCC stripper to the regenerator contains hydrogen-containing components, such as coke or unstripped hydrocarbons adhering thereto. This hydrogen burns in the regenerator to form water and cause hydrothermal degradation.

U.S. Pat. No. 4,336,160 to Dean et al, which is incorporated by reference, attempts to reduce hydrothermal degradation by staged regeneration. However, the flue gas from both stages of the regenerator contains SOx which is difficult to clean. It would be beneficial, even in staged regeneration, if the amount of water precursors present on stripped catalyst was reduced.

Steaming is more of a problem as regenerators get hotter. Higher temperatures accelerate the deactivating effects of steam.

TEMPERATURE

Regenerators are operating at higher temperatures. This is because most FCC units are heat balanced, that is, the endothermic heat of the cracking reaction is supplied by burning the coke deposited on the catalyst. With heavier feeds, more coke is deposited on the catalyst than is needed for the cracking reaction. The regenerator runs hotter, so the extra heat may be rejected as high temperature flue gas. Many refiners limit the amount of resid or high CCR feeds to that amount which can be tolerated by the unit. High temperatures are a problem for the metallurgy of many units, but more importantly, are a problem for the catalyst. In the regenerator, the burning of coke and unstripped hydrocarbons leads to much higher surface temperatures on the catalyst than the measured dense bed or dilute phase temperature. This is discussed by Occelli et al in *Dual-Function Cracking Catalyst Mixtures*, Ch. 12, Fluid Catalytic Cracking, ACS Symposium Series 375, American Chemical Society, Wash., D.C., 1988.

Some regenerator temperature control is possible by adjusting the CO/CO2 ratio in the regenerator. Burning coke partially to CO produces less heat than complete combustion to CO2. However, in some cases, this control is insufficient, and also leads to increased CO emissions, which can be a problem unless a CO boiler is present.

The prior art also used dense or dilute phase regenerator heat removal zones or heat-exchangers remote from, and external to, the regenerator to cool hot regenerated catalyst for return to the regenerator. Such approaches help, but we wanted to reduce the amount of unstripped hydrocarbons burned in the regenerator, rather than deal with unwanted heat release in the regenerator.

NOX

Burning nitrogenous compounds in FCC regenerators has long led to creation of minor amounts of NOx emitted with the regenerator flue gas, or associated with a downstream CO boiler. Usually these emissions were not much of a problem because of relatively low temperatures.

Many FCC units now operate at higher temperatures, with a more oxidizing atmosphere, and use CO combustion promoters such as Pt. These changes in regenerator operation which reduce CO emissions, usually increase nitrogen oxides (NOx) emissions. It is difficult in a catalyst regenerator to completely burn coke and CO in the regenerator without increasing the NOx content of the regenerator flue gas, so NOx emissions are now frequently a problem. Higher regenerator temperatures, due in part to burning of potentially strippable hydrocarbons in the regenerator contributes to the NOx problem.

It would be beneficial if a better stripping process were available which would increase recovery of valuable, strippable hydrocarbons. There is a special need to remove more hydrogen from spent catalyst to minimize hydrothermal degradation in the regenerator. It would be further advantageous to remove more sulfur-containing compounds from spent catalyst prior to regeneration to minimize SOx in the regenerator flue gas. Also, it would be advantageous to have a way to reduce to some extent regenerator temperature.

Although much work has been one on better stripping designs, there are still many shortcomings. We realized that the most significant problem was trying to achieve efficient stripping in a bubbling dense bed.

Although it might seem easy to increase the superficial vapor velocity in a stripper, by increasing the stripping steam rate, and improve stripping, in practice this is not possible. Increasing the stripping steam usually improves stripping, but in many units much of the increased stripping steam enters the regenerator. Stripping improves because of better settling or deration of spent catalyst within or just above the stripper.

We have now found a way to achieve better stripping of coked FCC catalyst. Our solution not only improves stripping, and increases the yield of valuable liquid product, it reduces the load placed on the catalyst regenerator, minimizes SOx emissions, and permits processing of more difficult feeds. Regenerator temperatures can be increased, reduced, or maintained constant while processing worse feeds, while the amount of hydrothermal deactivation of catalyst in the regenerator can be reduced.

We were able to overcome one significant deficiency of current spent catalyst strippers by correcting a mass flow problem peculiar to annular catalyst strippers disposed about a riser reactor. The problem was that one side of the stripper, the side opposite the stripped catalyst outlet line to the regenerator, was relatively dead or stagnant. Mass flow through the stripper was primarily down one side, with much of the spent catalyst passing, or bypassing, from the top of the annular stripper down one side to the stripped catalyst outlet. The catalyst flow on the other side of the stripper, i.e., on the side farthest from the stripped catalyst outlet, catalyst flow was relatively stagnant. The large "dead zone" in the base of the stripper on the side opposing the outlet, tended to make the area above it relatively dead, so that a large portion of the active volume of the stripper did little or no productive stripping. In some units, up to 20% of the stripper volume was "dead", or had a catalyst residence time at least twice as long as the average catalyst residence time in the stripper. This reduction in active, or effective, stripper volume could increase delta coke by 5% or more, with most of this coke being hydrogen rich strippable hydrocarbons.

We discovered a way to eliminate the dead zone using a catalyst transfer means. We were also able to conduct additional stripping in the transfer means, and even achieve multiple stage stripping in an annular stripper, preferably by adding baffling.

BRIEF SUMMARY OF THE INVENTION

Accordingly, the present invention provides a fluidized catalytic cracking process wherein a heavy hydrocarbon feed comprising hydrocarbons having a boiling point above about 650 F. is catalytically cracked to lighter products by contact with a circulating fluidizable catalytic cracking catalyst inventory consisting of particles having a size ranging from about 20 to about 100 microns, comprising catalytically cracking said feed in a riser catalytic cracking reactor operating at riser catalytic cracking conditions by contacting feed with a source of regenerated catalyst to produce a riser cracking reactor effluent mixture comprising cracked products and spent catalyst containing coke and strippable hydrocarbons, separating said effluent mixture into a cracked product vapor phase and a solids rich phase comprising spent catalyst, discharging said solids rich phase down into an annular stripper disposed about said riser reactor, said annular stripper having a near side near a catalyst regenerator and above a stripped catalyst outlet connective with said regenerator and a far said on the other side of said near side, partially stripping catalyst by counter-current contact with a stripping vapor at dense bed catalyst stripping conditions by passing at least a portion of said solids rich phase down through a primary dense bed stripping region on said far side of said annular stripper to a primary stripped catalyst outlet, transporting and stripping said catalyst removed from said primary stripped catalyst outlet by adding said removed catalyst and stripping vapor to a catalyst transport means comprising a vertical tube having a lower inlet connective with said primary stripped catalyst outlet and an upper outlet above or in an upper portion of said near side of said annular stripper, stripping catalyst discharged from said transport means by counter-current contact with a stripping vapor at dense bed catalyst stripping conditions by passing at least a portion of said discharged catalyst down through a secondary dense bed stripping region in said near side of said annular stripper to produce stripped catalyst in a lower portion of said near side of said annular stripper, withdrawing said stripped catalyst from said near side of said annular stripper and charging same to a catalyst regeneration means, regenerating said stripped catalyst in a catalyst regeneration means to produce regenerated catalyst; and recycling said regenerated catalyst to said catalytic cracking reactor.

In a preferred embodiment, the present invention provides a fluidized catalytic cracking process wherein a heavy hydrocarbon feed comprising hydrocarbons having a boiling point above about 650 F. is catalytically cracked to lighter products by contact with a circulating fluidizable catalytic cracking catalyst inventory consisting of particles having a size ranging from about 20 to about 100 microns, comprising catalytically cracking said feed in a riser catalytic cracking reactor operating at riser catalytic cracking conditions by contacting feed with a source of regenerated catalyst to produce a riser cracking reactor effluent mixture comprising cracked products and spent catalyst containing coke and strippable hydrocarbons; cyclonically separating, in a cyclone separation means having a dipleg, said effluent mixture into a cracked product vapor phase and a solids rich phase comprising spent catalyst; discharging said solids rich phase down said cyclone dipleg into an annular stripper disposed about said riser reactor, said annular stripper having a near side near said regenerator and between said regenerator and said riser reactor and a far side across from the riser reactor, and comprising: a primary stripper in said far side having a solids inlet in an upper portion thereof for spent catalyst discharged from said cyclone dipleg, a stripping gas inlet in a lower portion thereof for stripping vapor, and a solids outlet in a lower portion thereof for removal of partially stripped catalyst via a catalyst transfer means; said catalyst transfer means comprising a vertical tube having a lower inlet connective with said solids outlet of said primary stripper, an inlet for lift gas, and an upper outlet above or in an upper portion of said near side of said annular stripper, a secondary stripper in said near side of said annular stripper having an inlet in an upper portion thereof for partially stripped catalyst discharged from said catalyst transfer means, a stripping gas inlet in a lower portion thereof for stripping vapor, and a solids outlet in a lower portion thereof for discharge of stripped catalyst to said catalyst regenerator; partially stripping catalyst in said primary stripper by counter-current contact with a stripping vapor at dense bed catalyst stripping conditions by passing at least a portion of said solids rich phase down through said primary stripper to produce partially stripped catalyst which is discharged via said primary stripper solids outlet; transporting and stripping said partially stripped catalyst by adding additional stripping vapor to said catalyst transport means; stripping catalyst discharged from said transport means by counter-current contact with a stripping vapor at dense bed catalyst stripping conditions by passing at least a portion of said discharged catalyst down through said secondary stripper at dense bed stripping conditions to produce stripped catalyst; withdrawing said stripped catalyst from said secondary stripper and charging same to said catalyst regeneration means; regenerating said stripped catalyst in a catalyst regeneration means to produce regenerated catalyst; and recycling said regenerated catalyst to said catalytic cracking reactor.

In an apparatus embodiment, the present invention provides aAn apparatus for fluidized catalytic cracking comprising a reactor vessel; a catalyst regenerator along side of a vertical riser reactor; said vertical riser reactor, having a base section and an upper section; an inlet in the base of the riser for a hydrocarbon feed; an inlet in the base of the riser for a source of regenerated catalytic cracking catalyst; an outlet in the upper section of the riser for discharging catalytically cracked products and spent catalyst into said reactor vessel; a catalyst disengaging means within the reactor vessel for separation of cracked products from spent catalyst; a spent catalyst stripping means disposed as an annulus about said riser reactor and in a base portion of said reactor vessel, said annular stripper having a near side near said regenerator and a far side across from the riser reactor, and comprising a primary stripper in said far side having a solids inlet in an upper portion thereof for spent catalyst discharged from said cyclone dipleg, a stripping gas inlet in a lower portion thereof for stripping vapor, and a solids outlet in a lower portion thereof for removal of partially stripped catalyst via a catalyst transfer means; said catalyst transfer means comprising a vertical tube having a lower inlet connective with said solids outlet of said primary stripper, an inlet for lift gas, and an upper outlet above or in an upper portion of said near side of said annular stripper, a secondary stripper in said near side of said annular stripper having an inlet in an upper portion thereof for partially stripped catalyst discharged from said catalyst transfer means, a stripping gas inlet in a lower portion thereof for stripping vapor, and a solids outlet in a lower portion thereof for discharge of stripped catalyst to said catalyst regenerator; said catalyst regenerator having: an inlet in a lower section for an oxygen containing regeneration gas; an outlet for recycle of regenerated catalyst to the base of the riser reactor; and an outlet for flue gas.

BRIEF DESCRIPTION OF THE DRAWINGS

FIG. 2 (Invention) shows a side sectional view of a stripper of the invention.

FIG. 3 (Invention) shows a side sectional view of a baffled annular stripper of the invention.

DETAILED DESCRIPTION

DESCRIPTION OF PREFERRED EMBODIMENTS

Figure 1:
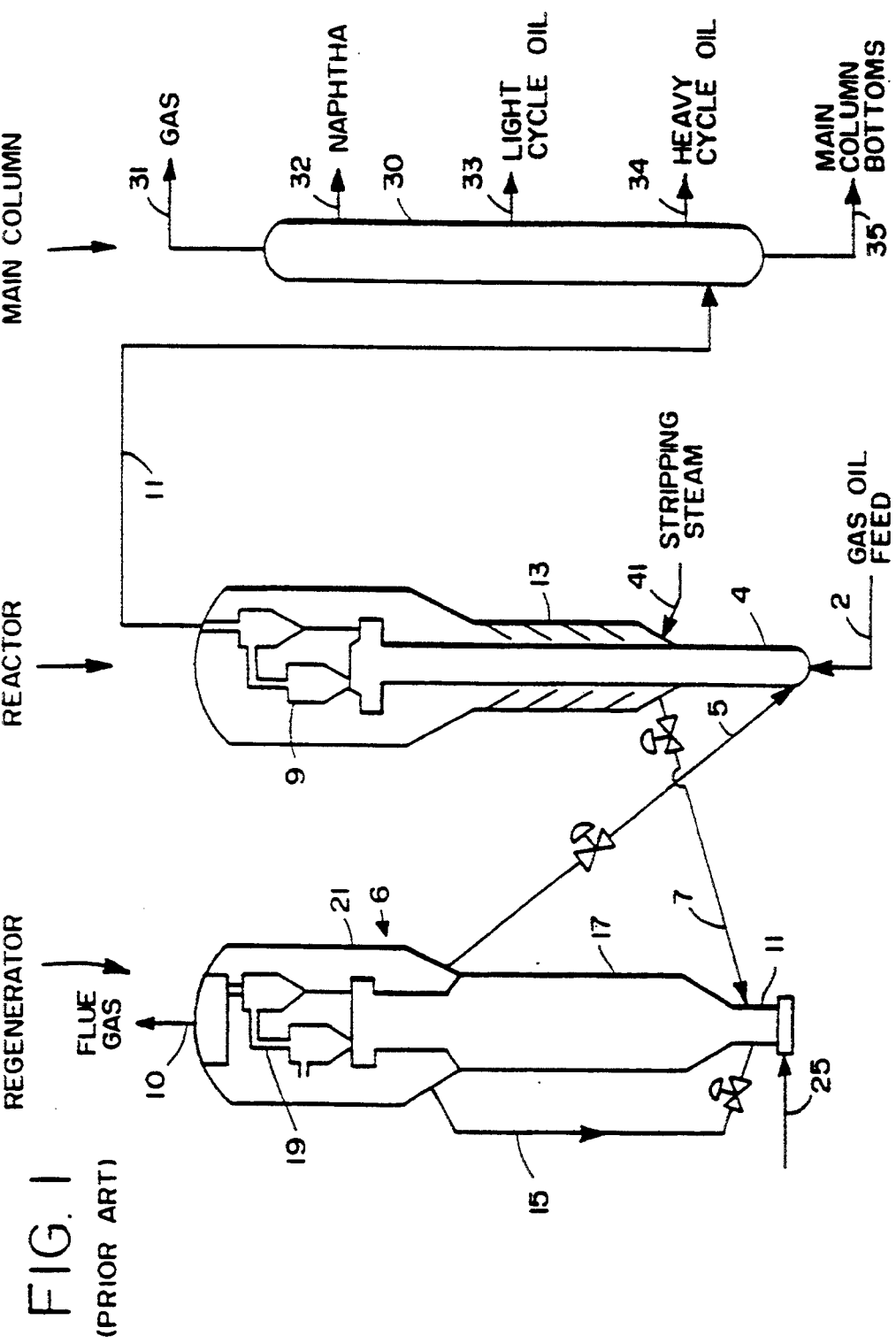
FIG. 1 (Prior Art) shows a simplified schematic view of an FCC unit with a conventional annular stripper.

FIG. (Prior Art) 1 is a simplified schematic view of an FCC unit of the prior art, similar to FIG. 1 of U.S. Pat. No. 5,073,249.

A heavy feed, typically a gas oil boiling range material, is charged via line 2 to the lower end of a riser cracking FCC reactor 4. Hot regenerated catalyst is added via conduit 5 to the riser. Preferably, some atomizing steam is added, by means not shown, to the base of the riser, usually with the feed. With heavier feeds, e.g., a resid, 2–10 wt. % steam may be used. A hydrocarbon-catalyst mixture rises as a generally dilute phase through riser 4. Cracked products and coked catalyst are discharged from the riser. Cracked products pass through two stages of cyclone separation shown generally as 9 in the figure.

The riser 4 top temperature, which usually is close to the temperature in conduit 11, ranges between about 480 and 615 C. (900 and 1150 F.), and preferably between about 538 and 595 C. (1000 and 1050 F.). The riser top temperature is usually controlled by adjusting the catalyst to oil ratio in riser 4 or by varying feed preheat.

Cracked products are removed from the FCC reactor via transfer line 14 and charged to the base of the main column 30. In some refineries, this column would be called the Syncrude column, because the catalytic cracking process has created a material with a broad boiling range, something like a synthetic crude oil. The main column 30 recovers various product fractions, from a heavy material such as main column bottoms, withdrawn via line 35 to normally gaseous materials, such as the vapor stream removed overhead via line 31 from the top of the column. Intermediate fractions include a heavy cycle oil fraction in line 34, a light cycle oil in line 33, and a heavy naphtha fraction in line 32.

Cyclones 9 separate most of the catalyst from the cracked products and discharges this catalyst down via diplegs to a stripping zone 13 located in a lower portion of the FCC reactor. Stripping steam is added via line 41 to recover adsorbed and/or entrained hydrocarbons from catalyst. Stripped catalyst is removed via line 7 and charged to a high efficiency regenerator 6. A relatively short riser-mixer section 11 is used to mix spent catalyst from line 7 with hot, regenerated catalyst from line 15 and combustion air added via line 25. The riser mixer discharges into coke combustor 17. Regenerated catalyst is discharged from an upper portion of the dilute phase transport riser above the coke combustor. Hot regenerated catalyst collects as a dense phase fluidized bed, and some of it is recycled via line 15 to the riser mixer, while some is recycled via line 5 to crack the fresh feed in the riser reactor 4. Several stages of cyclone separation are used to separate flue gas, removed via line 10. Catalyst which separates out from cracked products in the reactor vessel, and catalyst discharged from the cyclone diplegs, is generally uniformly distributed around the annular stripper.

In FIG. 2 (invention) only a cross sectional view of a stripper of the invention is shown. Like elements in FIG. 1 and 2 have like numerals. The riser reactor 4, and the regenerator (not shown) can be identical.

An active bed annular stripper 130 is formed by providing a catalyst transfer means 155, which removes catalyst from the normally "dead" region 190 in the base of the stripper opposite outlet line 7. Lift steam added via line 150 carries catalyst up transfer means 155 to be discharged above the stripper on the "live" side, region 180 i.e., above outlet line 7.

At least partially stripped catalyst, and lift steam added via line 150 are discharged via outlet 160. Most of the lift steam will immediately pass up into the dilute phase region 170 above stripper 113, without increasing superficial vapor velocity within the active area of the stripper containing chevron plates 130 and 132 on the outer and inner walls of the stripper, respectively.

Stripping steam is added, as in the prior art stripping process, via steam line 141 and steam ring or distributor means 144. Steam may be added via multiple spargers, or at multiple elevations, but for simplicity only a single steam ring 144 is shown. Stripped catalyst from the base of the stripper is withdrawn via line 7 and charged to the catalyst regenerator, not shown.

In FIG. III a multi-stage, baffled stripper of the invention is shown. In this embodiment, catalyst is either preferentially added, and/or caused by the baffle means discussed hereafter, to flow into the far side of the stripper from the regenerator. Thus catalyst flows almost exclusively into the annular stripper above heretofore "dead" region 290 on the opposite side of the stripped catalyst outlet 7. As shown, a reactor cyclone dipleg 210 discharges most of the catalyst. The dipleg is sealed by immersion in the bed of catalyst within the stripper. What had been a dead region now becomes a primary stripping region 290. Catalyst is withdrawn via outlet 240 and lifted by lift steam or other fluidizing gas up lift means 255 for transport to a preferred, but optional, catalyst/vapor separation means. The cyclone separator, preferably a low pressure drop and relatively low efficiency cyclone 205 discharges a lift steam and stripped hydrocarbon vapor stream via outlet tube 207 and a catalyst rich stream via dipleg 209. Dipleg 209, which may have a flapper valve or other seal means not shown, discharged catalyst into inlet 260 to the secondary stripper. The secondary stripper is defined by the outer walls of stripper 213 and an inner baffle 220, which can be a vertical wall dividing the annular stripper into two equal (or unequal) section. Preferably baffle 220 is aligned with the riser axis and divides the annular stripper into two vertical half cylinders, if the volume of the riser 4 is ignored. Steam addition is preferably individually controlled to each region, with primary stripping steam added via line 341 to steam distribution means 344. Steam to the secondary stripping zone is added via steam line 241 and distribution means 244.

Stripped vapors attributable to stripping steam added via line 241 and distributor 244, and stripped hydrocarbons from the secondary stripping zone are removed from the top of the secondary stripping zone via outlet 265. The secondary stripping zone may be sealed with catalyst, as shown, or outlet 265 may be above the dense bed catalyst level in the primary stripping zone, above region 290. The baffle 220 effectively isolates the secondary stripping zone from the dilute phase region 270 and the primary stripping zone above region 290. If the dense bed level in the primary stripping zone is fairly low, then it may be necessary to seal the outlet of the cyclone dipleg 210 with a flapper valve or other seal means.

CATALYST FLOW IN ACTIVE BED STRIPPERS

In FIG. II, spent catalyst discharged from the riser is more or less uniformly added to the annular stripper. There are several interrelated catalyst flows in the stripper, with some of the catalyst taking a relatively short, one-way trip through the stripper from the top more or less straight down through the chevron plates to outlet 7. This is offset, or decreased, by the addition of transported catalyst preferentially above the outlet 7, so that the catalyst most likely to short circuit the stripper is catalyst which has already been through the "dead" region and the transport means. Much of the catalyst initially flowing in to the annular stripper flows to the "dead" side, above region 190, because of the large mass flow of catalyst discharged via outlet 160. Thus much, and preferably most, of the catalyst bypasses the "live" region above outlet 7, and flows through "dead" region 190 to the transport pipe. There will be some traffic between the live and dead regions, but such traffic is limited. In bubbling dense beds, there is fairly efficient mixing and transport up and down, but only poor mixing from side to side, and it is this poor mixing which lead to "dead" regions in the conventional approach to stripping. Our design makes productive use of this inherent property of bubbling dense bed strippers, to achieve a measure of multi-stage stripping in a device which might appear to operate as a single dense bed.

In the FIG. III approach, there is essentially no traffic between the primary stripping stage and the secondary. All spent catalyst entering the stripper is forced, by the action of baffle means 220, to flow into the primary stripping region. All of this catalyst is then subjected to dilute phase stripping during transport to the other side of the stripper. Transported catalyst is the exclusive catalyst feed to the secondary stripping region 280 above outlet 7. In the embodiment shown, a cyclone separator 205 is used to remove stripper vapor and stripped hydrocarbons to reduce vapor flow in the secondary stripping region 280.

Now that the invention has been reviewed in connection with the embodiments shown in FIGS. 2 and 3, a more detailed discussion of the different parts or the process and apparatus of the present invention follows. Many elements of the present invention can be conventional, such as the cracking catalyst, so only a limited discussion of such elements is necessary.

FCC FEED

Any conventional FCC feed can be used. The process of the present invention is especially useful for processing difficult charge stocks, those with high levels of CCR material, exceeding 2, 3, 5 and even 10 wt % CCR. The process, especially when operating in a partial CO combustion mode, tolerates feeds which are relatively high in nitrogen content, and which otherwise might result in unacceptable NOx emissions in conventional FCC units.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids. The present invention is most useful when feeds contain more than 5, or more than 10 wt % material which is not normally distillable in refineries. Usually all of the feed will boil above 650 F., and 5 wt %, 10 wt % or more will boil above 1000 F.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5-40 wt. % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 Wt % RE.

Relatively high silica zeolite containing catalysts are preferred for use in the present invention. They withstand the high temperatures usually associated with complete combustion of CO to CO2 within the FCC regenerator.

The catalyst inventory may also contain one or more additives, either present as separate additive particles or mixed in with each particle of the cracking catalyst. Additives can be added to enhance octane (shape selective zeolites, i.e., those having a Constraint Index of 1-12, and typified by ZSM-5, and other materials having a similar crystal structure), adsorb SOX (alumina), remove Ni and V (Mg and Ca oxides).

Most units will operate with a conventional inventory of FCC catalyst rather than with a mix of elutriable particles, for several reasons. Conventional FCC catalyst (whether fresh or equilibrium catalyst) is a staple article of commerce, readily available anywhere in the world. Most of the work on designing and running FCC units has been done with such particles. Also, many design problems can be avoided by using conventional sized particles, e.g., there is no concern that large particles of ZSM-5 will be trapped forever in the regenerator. Design and operation of the FFB stripper are also greatly simplified if the catalyst used has a conventional particle size distribution, with an average particle size of around 60-80 microns.

The FCC catalyst composition, per se, forms no part of the present invention.

FCC REACTOR CONDITIONS

Conventional FCC reactor conditions may be used. The reactor may be either a riser cracking unit or dense bed unit or both. Riser cracking is highly preferred. Typical riser cracking reaction conditions include catalyst/oil ratios of 0.5:1 to 15:1 and preferably 3:1 to 8:1, and a catalyst contact time of 0.5-50 seconds, and preferably 1-20 seconds, and riser top temperatures of 900 to 1200 F., preferably 950 to 1050 F.

The FCC reactor conditions, per se, are conventional and form no part of the present invention.

CATALYST STRIPPING

Usually stripping steam will be used as the stripping medium, and usually in an amount, in the aggregate, roughly equal or somewhat greater than that used in conventional strippers. The process of the present invention does not necessarily involve use of more steam, but rather makes better use of stripping steam.

Many units will operate with aggregate amounts of stripping vapor, expressed as wt % steam, equivalent to 0.5 to 10 wt % steam (based on the weight of fresh feed) preferably 1 to 6 wt % steam, and most preferably 1.5 to 4 wt % steam. The conditions in each stripping region are discussed at greater length below Primary Stripping Region The superficial vapor velocity will be sufficient to maintain this region as a bubbling dense bed, or perhaps as a turbulent fluidized bed. The superficial vapor velocity will usually be well above 0.1 fps, and preferably is from 0.5 to 7.5 fps, more preferably from 1 to 6 fps, and most preferably from 1.5 to 5 fps.

In terms of steam distribution, the primary stripping region should receive at least 10% of the total stripping steam, or other stripping fluid, used. Preferably from 15 to 50% of the total stripping steam is added to the primary stripping region.

Transport Means

Dilute phase transport of catalyst from the base of the primary stripping region to the top of the secondary stripping region is strongly preferred. Use of a transport means with a high L/D ratio is preferred. When the transport means is sized to move most or all of the catalyst from the primary to the secondary stripping means (e.g., the FIG. III embodiment), the transport means will have a diameter approaching that of the base of the riser reactor, because the catalyst amount is the same, and the conditions can be similar (dilute phase in both).

In terms of superficial vapor velocity, the transport means, in the vertical run of pipe or tubing, will operate with a superficial vapor velocity at least sufficient to sustain a turbulent fluidized bed and preferably sufficient to maintain fast fluidized bed (FFB) operation and most preferably slightly higher than this. The upper limit on superficial vapor velocity will be set by economics and the ability of the refinery to deal with large amounts of steam. It will not usually be necessary, or beneficial to operate with velocities as high as those commonly used in riser reactors.

In terms of superficial vapor velocity, the vertical transport means will usually have a velocity above 5 fps, preferably above 6 fps, and most preferably above 7.5 fps. In many units, operation with 5 to 15 fps superficial vapor velocity will give good results, with 7.5 to 12.5 considered about optimum.

A fairly large amount of slip can be tolerated in the transport means, not only to minimize the amount of steam that must be used to move catalyst around, but to give catalyst additional contact time with steam in a vigorous environment.

At least 20% of the total steam used for stripping should be added to the transport means, and preferably at least 30% is added here. In many unit, addition of 35 to 75% of the stripping steam will occur, with about 40-60% optimum in many instances.

Secondary Stripping Region

This region is secondary in the sense of being the second relatively dense phase fluidized bed. It could also be called a third stage stripper, the first being the primary stripping region, and the second being the transport means.

Conditions in this region can be identical to those in the primary stripping region. Preferably the superficial vapor velocities are somewhat lower than those used in the primary zone. This is because deration, reducing the amount of steam sent into the regenerator along with stripped catalyst is an important concern. On balance, lower vapor velocities, and somewhat reduced stripping efficiency, are preferred because this sends less steam into the regenerator.

Superficial vapor velocities in this region will usually be above 0.1 fps, and preferably will be 0.5 to 5 fps, more preferably 0.75 to 4 fps, and most preferably 1 to 3 fps.

Less than 50% of the total stripping steam should be added to this region, and preferably less than 40%. In many units, operation with only 10 to 40% of the stripping steam added to the secondary stripping region will give excellent results, with 15 to 30% optimum in many units.

The reduced stripping duty imposed on this stage improves deaeration, and reduces steam carryover into the regenerator. Enough steam should be added to maintain good fluidization, but efficient stripping is not so important at this point.

Overall, the amount of stripping steam will be about the same, or only slightly more than in prior art units. Some stripping is still achieved in the primary stripping section, but this section can not be pushed too much because this will make it hard to move a large mass of catalyst through the stripper. Quite a lot of stripping is achieved in the transport means, and this stripping steam need not add to the vapor traffic in any of the bubbling bed portions of the stripper, i.e., the annular portions of the stripper. Preferably little stripping beyond that inherent in settling is achieved in the secondary stripping stage, to prevent a mass-flow bottleneck, and reduce steam partial pressure in the regenerator.

Preferably diplegs from riser reactor outlet cyclones are used to add the spent catalyst to the primary stripping region. This allows spent catalyst to bypass stripper vapors discharged from the top of the stripper.

The present invention can also be used to increase the effectiveness of hot strippers, e.g., those heated by recycling to the stripper hot, regenerated catalyst.

CATALYST REGENERATION

The invention can benefit FCC units using any type of regenerator, ranging from single dense bed regenerators to the more modern, high efficiency designs. Some means to regenerate catalyst is essential, but the precise configuration of the regenerator is not critical.

Single, dense phase fluidized bed regenerators can be used, or multiple stage dense bed regenerators, or high efficiency regenerators.

FCC REGENERATOR CONDITIONS

The temperatures, pressures, oxygen flow rates, etc., are within the broad ranges of those heretofore found suitable for FCC regenerators, especially those operating with substantially complete combustion of CO to $CO_2$ within the regeneration zone. Suitable and preferred operating conditions are:

|  | Broad | Preferred |
|---|---|---|
| Temperature, °F. | 1100–1700 | 1150–1400 |
| Catalyst Residence Time, Seconds | 60–3600 | 120–600 |
| Pressure, atmospheres | 1–10 | 2–5 |
| % Stoichiometric $O_2$ | 100–120 | 100–105 |

Use of a CO combustion promoter in the regenerator is not essential for the practice of the present invention, however, it is preferred. These materials are well-known.

U.S. Pat. No. 4,072,600 and U.S. Pat. No. 4,235,754, incorporated by reference, disclose operation of an FCC regenerator with minute quantities of a CO combustion promoter. From 0.01 to 100 ppm Pt metal or enough other metal to give the same CO oxidation, may be used with good results. Very good results are obtained with as little as 0.1 to 10 wt. ppm platinum present on the catalyst in the unit. In swirl type regenerators, operation with 1 to 7 ppm Pt commonly occurs. Pt can be replaced by other metals, but usually more metal is then required. An amount of promoter which would give a CO oxidation activity equal to 0.3 to 3 wt. ppm of platinum is preferred.

Catalyst coolers may be used, if desired. Such devices are very useful, especially when processing heavy feeds, but many units operate without them. In general, there will be less need for catalyst coolers, because more efficient stripping of catalyst reduces the amount of fuel (unstripped hydrocarbons) that must be burned in the regenerator. Better stripping also reduces the steam partial pressure in the regenerator (by removing more of the hydrogen rich "fast coke" on spent catalyst in the stripper) so the catalyst can tolerate somewhat hotter regenerator temperatures. Thus the regenerator will usually be able to operate cooler and dryer permitting higher temperature operation without excessive catalyst deactivation, so catalyst coolers will be harder to justify.

DISCUSSION

Our invention involves an unusual stripping operation.

Conventional (prior art) annular strippers operated at a restricted superficial vapor velocity, to minimize displacement of catalyst from the stripper to the dilute phase region above the stripper. All catalyst entered the top, usually evenly distributed, while all exited the bottom of the stripper on one side leading to the regenerator. Operation was a constant battle, between a desire for more counter-current stripping and the difficulty of getting large masses of catalyst through the strippers small annular stripping volume to the regenerator outlet. To make matters worse, the side of the stripper across from the outlet to the regenerator was largely dead, causing much of the space above the dead zone to be moribund as well, losing perhaps 20% of the stripper volume.

Our approach to stripping improves stripping, by doing less counter-current stripping, and some co-current stripping. We do not use more steam, but rather make better use of steam that is added. Out design tolerates use of much large amounts of stripping steam, provided that most of the steam added goes to the transport means, and preferably uses a transport means with some sort of catalyst/vapor separation means at the outlet.

When a conventional annular stripper is modified by adding an outlet to our transport means on the opposite side from the stripped catalyst outlet to the regenerator, we achieve something approaching multistage stripping in a single vessel. We do this without partition, and in a fail safe manner, i.e., if something goes wrong with the transport lift pipe our stripper becomes a conventional stripper again. We use the poor side-to-side mixing characteristics of dense beds to achieve multi-stage stripping in a single vessel. Adding baffles provides a more efficient and rigorous stripping operation, but the capital costs and potential complications offset this to some extent.

The process and apparatus of the present invention allow refiners to improve the last great region of inefficiency remaining in FCC processing. Refiners have been plagued with strippers which left large amounts of potentially recoverable product on the spent catalyst, in some cases, $\frac{1}{3}$ up to almost $\frac{1}{2}$ of the "coke" was potentially recoverable product. As an example, moving bed strippers, using large size bead catalyst, were able to strip catalyst so efficiently that it contained only about 5 wt % hydrogen (the hydrogen being a measure of hydrocarbons remaining on catalyst). Most FCC catalyst strippers leave more than 8 wt & hydrogen on the coke, and some annular strippers leave 8 to 10 wt % hydrogen. This is a measure of how bad stripping is in FCC, in that stripping efficiency has never equaled that achieved in moving bed cracking units. To put this is perspective, it should be remembered that moving bed cracking units use large bead catalyst far more than 10 times as large as FCC catalyst, and therefore more diffusion limited, and that moving bed cracking achieved this level of stripping efficiency almost 40 years ago.

Refiners now can make less coke, and more product, operate their units more efficiently, and without undue capital expense, and usually with no incremental operating expense.

The benefits of active bed annular stripping are an immediate increase in the amount of liquid product recovered, a reduction in regenerator air blower duty, increased catalyst life due both to a cooler regenerator and to a drier regenerator, and increased conversion due to "winding up" the unit by increasing catalyst circulation to maintain a constant riser top temperature with cooler catalyst.

Merely eliminating the dead region of conventional annular strippers can reduce coke on regenerated catalyst by more than 5 %, leading to a significant increase in capacity for units which are regenerator limited.

While at first glance our process might seem to overload some annular strippers, because of the doubling of catalyst flow through roughly the same cross sectional area, this need not occur in practice. We can safely reduce the superficial vapor velocity in selected sections of the stripper, relying on staged stripping or stripping in the transfer line to do much of the stripping. As an example, greatly reduced gas velocity in the secondary stage stripper can be tolerated if much of the stripping vapor is added as shown in the FIG. 3 embodiment, wherein this stripping vapor does not have to pass through the stripper at all. Thus it is possible to greatly increase catalyst flux, without necessarily further overloading the stripper.

We claim:

1. A fluidized catalytic cracking process wherein a heavy hydrocarbon feed comprising hydrocarbons having a boiling point above about 650 F. is catalytically cracked to lighter products by contact with a circulating fluidizable catalytic cracking catalyst inventory consisting of particles having a size ranging from about 20 to about 100 microns, comprising:
   a. catalytically cracking said feed in a riser catalytic cracking reactor operating at riser catalytic cracking conditions by contacting feed with a source of regenerated catalyst to produce a riser cracking reactor effluent mixture comprising cracked products and spent catalyst containing coke and strippable hydrocarbons;
   b. separating said effluent mixture into a cracked product vapor phase and a solids rich phase comprising spent catalyst;
   c. discharging said solids rich phase down into an annular stripper disposed about said riser reactor, said annular stripper having a near side near a catalyst regenerator and above a stripped catalyst outlet connective with said regenerator and a far said on the other side of said near side,
   d. partially stripping catalyst by counter-current contact with a stripping vapor at dense bed catalyst stripping conditions by passing at least a portion of said solids rich phase down through a primary dense bed stripping region on said far side of said annular stripper to a primary stripped catalyst outlet;

e. transporting and stripping said catalyst removed from said primary stripped catalyst outlet by adding said removed catalyst and stripping vapor to a catalyst transport means comprising a vertical tube having a lower inlet connective with said primary stripped catalyst outlet and an upper outlet above or in an upper portion of said near side of said annular stripper;

f. stripping catalyst discharged from said transport means by counter-current contact with a stripping vapor at dense bed catalyst stripping conditions by passing at least a portion of said discharged catalyst down through a secondary dense bed stripping region in said near side of said annular stripper to produce stripped catalyst in a lower portion of said near side of said annular stripper;

g. withdrawing said stripped catalyst from said near side of said annular stripper and charging same to a catalyst regeneration means;

h. regenerating said stripped catalyst in a catalyst regeneration means to produce regenerated catalyst; and i. recycling said regenerated catalyst to said catalytic cracking reactor.

2. The process of claim 1 wherein 50 to 80% of catalyst discharged from said riser passes through said primary stripping region, and the remainder bypasses said primary region and said transport means and flows directly into said secondary stripping region.

3. The process of claim 1 wherein said annular stripper has a generally vertical, imperforate baffle splitting said annular stripper into a near side and a far side, and wherein essentially all catalyst discharged from said riser passes through said far side.

4. The process of claim 1 wherein dense bed stripping conditions are maintained in said primary and secondary stripping regions, and dilute phase stripping conditions are maintained in said transport means.

5. The process of claim 1 wherein the superficial vapor velocity in said primary stripper is from 0.2 to 4 fps, in said transport means is 2 to 30 fps, and in said secondary stripper is 0.2 to 4 fps.

6. The process of claim 1 wherein the superficial vapor velocity in said primary stripper is from 0.5 to 3 fps, in said transport means is 4 to 25 fps, and in said secondary stripper is 0.4 to 3 fps.

7. The process of claim 1 wherein the superficial vapor velocity in said primary stripper is about 1 fps, in said transport means is about 10 fps, and in said secondary stripper is about 1 fps.

8. The process of claim 1 wherein the transport means has an outlet comprising a catalyst/vapor separation means.

9. The process of claim 8 wherein the transport means has an outlet is a cyclone with a vapor outlet in a dilute phase region above said annular stripper and a dipleg outlet for catalyst above said secondary stripper.

10. The process of claim 1 wherein said riser reactor effluent is cyclonically separated in primary cyclones having diplegs for discharge of spent catalyst and a separated spent catalyst stream is discharged down from said diplegs into said primary stripper.

11. A fluidized catalytic cracking process wherein a heavy hydrocarbon feed comprising hydrocarbons having a boiling point above about 650 F. is catalytically cracked to lighter products by contact with a circulating fluidizable catalytic cracking catalyst inventory consisting of particles having a size ranging from about 20 to about 100 microns, comprising:

a. catalytically cracking said feed in a riser catalytic cracking reactor operating at riser catalytic cracking conditions by contacting feed with a source of regenerated catalyst to produce a riser cracking reactor effluent mixture comprising cracked products and spent catalyst containing coke and strippable hydrocarbons;

b. cyclonically separating, in a cyclone separation means having a dipleg, said effluent mixture into a cracked product vapor phase and a solids rich phase comprising spent catalyst;

c. discharging said solids rich phase down said cyclone dipleg into an annular stripper disposed about said riser reactor, said annular stripper having a near side near said regenerator and between said regenerator and said riser reactor and a far side across from the riser reactor, and comprising:

a primary stripper in said far side having a solids inlet in an upper portion thereof for spent catalyst discharged from said cyclone dipleg, a stripping gas inlet in a lower portion thereof for stripping vapor, and a solids outlet in a lower portion thereof for removal of partially stripped catalyst via a catalyst transfer means;

said catalyst transfer means comprising a vertical tube having a lower inlet connective with said solids outlet of said primary stripper, an inlet for lift gas, and an upper outlet above or in an upper portion of said near side of said annular stripper a secondary stripper in said near side of said annular stripper having an inlet in an upper portion thereof for partially stripped catalyst discharged from said catalyst transfer means, a stripping gas inlet in a lower portion thereof for stripping vapor, and a solids outlet in a lower portion thereof for discharge of stripped catalyst to said catalyst regenerator;

d. partially stripping catalyst in said primary stripper by counter-current contact with a stripping vapor at dense bed catalyst stripping conditions by passing at least a portion of said solids rich phase down through said primary stripper to produce partially stripped catalyst which is discharged via said primary stripper solids outlet;

e. transporting and stripping said partially stripped catalyst by adding additional stripping vapor to said catalyst transport means;

f. stripping catalyst discharged from said transport means by counter-current contact with a stripping vapor at dense bed catalyst stripping conditions by passing at least a portion of said discharged catalyst down through said secondary stripper at dense bed stripping conditions to produce stripped catalyst;

g. withdrawing said stripped catalyst from said secondary stripper and charging same to said catalyst regeneration means;

h. regenerating said stripped catalyst in a catalyst regeneration means to produce regenerated catalyst; and i. recycling said regenerated catalyst to said catalytic cracking reactor.

12. The process of claim 11 wherein said annular stripper has a vertical, imperforate baffle splitting said annular stripper into a primary stripper and a secondary stripper.

13. The process of claim 11 wherein dense bed stripping conditions are maintained in said primary and secondary strippers, and dilute phase stripping conditions are maintained in said transport means.

14. The process of claim 11 wherein the superficial vapor velocity in said primary stripper is from 0.2 to 4 fps, in said transport means is 2 to 30 fps, and in said secondary stripper is 0.2 to 4 fps.

15. The process of claim 11 wherein the superficial vapor velocity in said primary stripper is from 0.5 to 3 fps, in said transport means is 4 to 25 fps, and in said secondary stripper is 0.4 to 3 fps.

16. The process of claim 11 wherein the superficial vapor velocity in said primary stripper is about 1 fps, in said transport means is about 10 fps, and in said secondary stripper is about 1 fps.

17. The process of claim 11 wherein the transport means has an outlet comprising a catalyst/vapor separation means.

18. The process of claim 11 wherein the transport means has an outlet is a cyclone with a vapor outlet in a dilute phase region above said annular stripper and a dipleg outlet for catalyst above said secondary stripper.

* * * * *